United States Patent [19]

Powers et al.

[11] Patent Number: 5,651,110

[45] Date of Patent: *Jul. 22, 1997

[54] APPARATUS AND METHOD FOR CONTROLLING DATA FLOW BETWEEN A COMPUTER AND MEMORY DEVICES

[75] Inventors: David T. Powers, Morgan Hill; David H. Jaffe, Belmont; Larry P. Henson, Santa Clara; Hoke S. Johnson, III, Monte Sereno; Joseph S. Glider, Palo Alto; Thomas E. Idleman, Santa Clara, all of Calif.

[73] Assignee: Micro Technology Corp., Anaheim, Calif.

[*] Notice: The term of this patent shall not extend beyond the expiration date of Pat. No. 5,212,785.

[21] Appl. No.: 422,005

[22] Filed: Apr. 12, 1995

Related U.S. Application Data

[63] Continuation of Ser. No. 18,983, Feb. 18, 1993, abandoned, which is a continuation of Ser. No. 566,703, Apr. 6, 1990, Pat. No. 5,212,785.

[51] Int. Cl.⁶ ................................................. G06F 13/14
[52] U.S. Cl. ........................... 395/182.05; 395/183.06; 395/858; 364/DIG. 1; 364/268.9; 364/266.5
[58] Field of Search .......................... 395/837, 858, 395/182.03, 182.05, 182.01, 182.07, 183.06, 183.19

[56] References Cited

U.S. PATENT DOCUMENTS

| | | | |
|---|---|---|---|
| 3,303,482 | 2/1967 | Jenkins | 360/47 |
| 3,377,623 | 4/1968 | Ruet et al. | 395/200 |
| 3,544,777 | 12/1970 | Winkler | 371/10.1 |
| 3,693,159 | 9/1972 | Hilberg | 395/425 |
| 3,772,652 | 11/1973 | Hilberg | 395/425 |
| 3,792,448 | 2/1974 | Bennett et al. | 395/182.03 |
| 3,803,560 | 4/1974 | Devoy et al. | 395/575 |
| 3,905,023 | 9/1975 | Perdiglia | 395/575 |
| 3,917,933 | 11/1975 | Scheuneman et al. | 371/10.2 |
| 3,964,056 | 6/1976 | Chardensier et al. | 395/275 |
| 4,070,704 | 1/1978 | Calle et al. | 395/700 |
| 4,093,985 | 6/1978 | Das | 395/575 |

(List continued on next page.)

FOREIGN PATENT DOCUMENTS

| | | |
|---|---|---|
| 0010211 | 4/1980 | European Pat. Off. . |
| 0059842 | 9/1982 | European Pat. Off. . |
| WO A-8910594 | 2/1989 | WIPO . |

OTHER PUBLICATIONS

"Multipathing in Peripheral Storage Systems", H. O. Hempy, IBM Corp. 1983.

J. Voelker, "Winchester Disks Reach For a Gigabyte", IEEE Spectrum, Feb 1987 pp 64–67.

M. Sisley, "Microprogram Development Techniques Adds Flexibility, New Electronics", vol 17, No. 23, Nov 27, 1984 pp. 35–38.

D. Simpson, "Raids vs. Sleds", System Integration, Nov 1989 pp 70–82.

(List continued on next page.)

*Primary Examiner*—Thomas G. Black
*Assistant Examiner*—John C. Loomis
*Attorney, Agent, or Firm*—Townsend and Townsend and Crew LLP

[57] ABSTRACT

A method and apparatus for controlling data flow between a computer and a group of memory devices arranged in a particular logical configuration. The system includes a group of first level controllers and a group of second level controllers. The first level controllers and the second level controllers work together such that if one of the second level controllers fails, the routing between the first level controllers and the memory devices is switched to a properly functioning second level controller without the need to involve the computer in the rerouting process. The logical configuration of the memory devices remains constant. The invention also includes switching circuitry which permits a functioning second level controller to assume control of a group of memory devices formerly primarily controlled by the failed second level controller.

10 Claims, 11 Drawing Sheets

U.S. PATENT DOCUMENTS

| | | | |
|---|---|---|---|
| 4,207,609 | 6/1980 | Luiz et al. | 395/325 |
| 4,339,804 | 7/1982 | Davison et al. | 395/425 |
| 4,342,079 | 7/1982 | Stewart et al. | 395/425 |
| 4,396,984 | 8/1983 | Lideki, II | 395/858 |
| 4,464,747 | 8/1984 | Groudan | 371/50.1 |
| 4,467,421 | 8/1984 | White | 395/425 |
| 4,468,731 | 8/1984 | Johnson et al. | 395/575 |
| 4,507,730 | 3/1985 | Johnson et al. | 395/425 |
| 4,667,326 | 5/1987 | Young et al. | 371/39.1 |
| 4,697,232 | 9/1987 | Brunelle et al. | 395/275 |
| 4,722,085 | 1/1988 | Flora et al. | 371/40.1 |
| 4,761,785 | 8/1988 | Clark et al. | 371/2.2 |
| 4,768,193 | 8/1988 | Takaae | 371/10.3 |
| 4,814,982 | 3/1989 | Weir | 395/275 |
| 4,817,035 | 3/1989 | Timsit | 395/425 |
| 4,825,403 | 4/1989 | Gershenson et al. | 360/52 |
| 4,849,929 | 7/1989 | Timsit | 395/575 |
| 4,868,818 | 9/1989 | Madan et al. | 371/11.3 |
| 4,899,342 | 2/1990 | Potter et al. | 371/10.1 |
| 4,914,656 | 4/1990 | Dunphy et al. | 371/10.2 |
| 5,053,942 | 10/1991 | Srini | 395/325 |
| 5,091,847 | 2/1992 | Herberman | 395/575 |
| 5,134,619 | 7/1992 | Henson et al. | 371/40.1 |
| 5,140,592 | 8/1992 | Idleman et al. | 371/8.1 |
| 5,166,939 | 11/1992 | Jaffe et al. | 371/40.1 |
| 5,195,100 | 3/1993 | Katz et al. | 371/66 |
| 5,212,785 | 5/1993 | Powers et al. | 395/575 |
| 5,233,618 | 8/1993 | Glider et al. | 371/68 |

OTHER PUBLICATIONS

T. Olson, "Disk Array Performance in a Random IO Envirorment," Computer Architecture, vol. 17, No. 5, Sep, 1989 pp 71–77.

W. Meador,"Disk Array Systems" Spring Comp–Con. 89 Digest Papers, IEEE Computer Society Press, pp 143–146.

D. Lieberman, "SCSI–2 Controller Board Builds Parallel Disk Drive Arrays," Computer Design, vol 28, No 7, Apr. 1989.

M. Kim, "Synchronized Disk Interleaving," IEEE Transacting on Computers, vol. C–35, No. 11 Nov 1986.

H. Sierra, "Assessing The Promise of Disk Arrays"Canadian Data Systems, May 1989, pp 52–53.

Program Summary, data Storage 86, An International Forum, Sep. 22–24, Red Lion Inn, San Jose, CA.

Product Description, Micropolis 1804 SCS, Parallel Disk Array, Document No. 108120 Rev. A.

D. Patterson, et al, "A Case For Redundant Arrays of Inexpensive Disks (RAID)"; Report No. UCB/TSD 87/391, Dec. 1987.

Jilke, W., "Disk Array Mass Storage Systems; The New Opportunity." Amperif Corp. Sep. 30 1986.

Jilke, W., "Economics Study of Disk Array Mass Storage Systems; The Lost Reduction Opportunity," Amperif Corp. Mar 24, 1987.

Blum, "Fast Access Disk File with Several Parallel Heads", IBM Technical Disclosure Bulletin, vol 25, No. 6 Nov 1982.

APPARATUS AND METHOD FOR CONTROLLING DATA FLOW BETWEEN A COMPUTER AND MEMORY DEVICES

This is a continuation of application Ser. No. 08/018,983, filed Feb. 18, 1993, now abandoned, which is a continuation of application Ser. No. 07/506,703, filed Apr. 6, 1990, now U.S. Pat. No. 5,212,785.

BACKGROUND OF THE INVENTION

The present invention relates generally to input/output communication. More particularly, the invention is a method and apparatus for controlling data flow through a group of first level memory device controllers and a group of second level memory device controllers such that if one of the second level memory device controllers experiences a failure, rerouting of data can be accomplished transparently to the computer.

Systems for controlling data flow between a computer and a group of memory devices typically include at least one controller situated between the computer and the memory devices. The controller is used to handle data communication between the computer and the memory devices. Computer systems can be configured to include a group of memory devices. Each such controller is assigned a particular group of memory devices. As data is output from the computer a particular controller will handle that data and store it in one of the memory devices under its control. Through the use of these controllers and the physical configuration of the memory devices, the logical configuration of the memory devices can be altered and set to the needs of the user.

In the case where one of the controllers experiences a failure, the computer must take action to isolate the failed controller and to switch the memory devices formally under the failed controller's control to a properly functioning other controller. The switching requires the computer to perform a number of operations. First, it must isolate the failed controller. This means that the path between the computer and the failed controller must be broken and all data flow directed to the failed controller must be redirected to a working controller.

In the system described above, it is necessary for the computer to be involved with rerouting data away from a failed controller. The necessary operations performed by the computer in completing rerouting requires the computer's attention. This places added functions on the computer which may delay other functions which the computer is working on. As a result, the entire system is slowed down.

SUMMARY OF THE INVENTION

The present invention is a method and apparatus for controlling data flow between a computer and a plurality of memory devices which can handle component failure in a manner transparent to the computer. Various types of memory devices can be implemented in the system (e.g. disk drives, tape drives etc.). For purposes of simplicity, the memory devices will be referred to as disk drives throughout the specification.

A plurality of first level controllers are each connected to the computer. Connected to the other side of the first level controllers is a set of second level controllers. Each first level controller can route data to any one of the second level controllers. Communication buses tie together the second level controllers and the first level controllers can also communicate between themselves. In a preferred embodiment, the system is configured such that the second level controllers are grouped in pairs. This configuration provides each second level controller with a single associated back-up controller. This configuration provides for efficient rerouting procedures for the flow of data to the disk drives. For ease of understanding, the specification will describe the system configured with pairs of second level controllers. Of course, it should be understood that the second level controllers could be configured in groups of three or other groupings.

A switching function is implemented to connect each of the second level controllers to a group of disk drives. In the case that a second level controller should fail, the computer need not get involved with the rerouting of data to the disk drives. Instead, the first level controllers and the properly working second level controller can handle the failure without the involvement of the computer. This allows the logical configuration of the disk drives to remain constant from the perspective of the computer despite a change in the physical configuration.

There are two levels of severity of failures which can arise in the second level controllers. The first type is a complete failure. In the case of a complete failure, the second level controller stops communicating with the first level controllers and the other second level controller. The first level controllers are informed of the failure by the properly working second level controller or may recognize this failure when trying to route data to the failed second level controller. In either case, the first level controller will switch data paths from the failed second level controller to a properly functioning second level controller. Once this rerouted path has been established, the properly functioning second level controller issues a command to the malfunctioning second level controller to release control of its disk drives. The properly functioning second level controller then assumes control of these disk drive arrays.

The second type of failure is a controlled failure where the failed controller can continue to communicate with the rest of the system. The partner second level controller is informed of the malfunction. The properly functioning second level controller then informs the first level controllers to switch data paths to the functioning second level controller. Next, the malfunctioning second level controller releases its control of the disk drives and the functioning second level controller assumes control. Finally, the properly functioning second level controller checks and, if necessary, corrects data written to the drives by the malfunctioning second level controller.

A further aspect of the present invention is a SCSI bus switching function which permits the second level controllers to release and assume control of the disk drives.

For a more complete understanding of the nature and the advantages of the invention, reference should be made to the ensuing detail description taken in conjunction with the accompanying drawings.

DETAILED DESCRIPTION OF THE DRAWINGS

Figure 1:
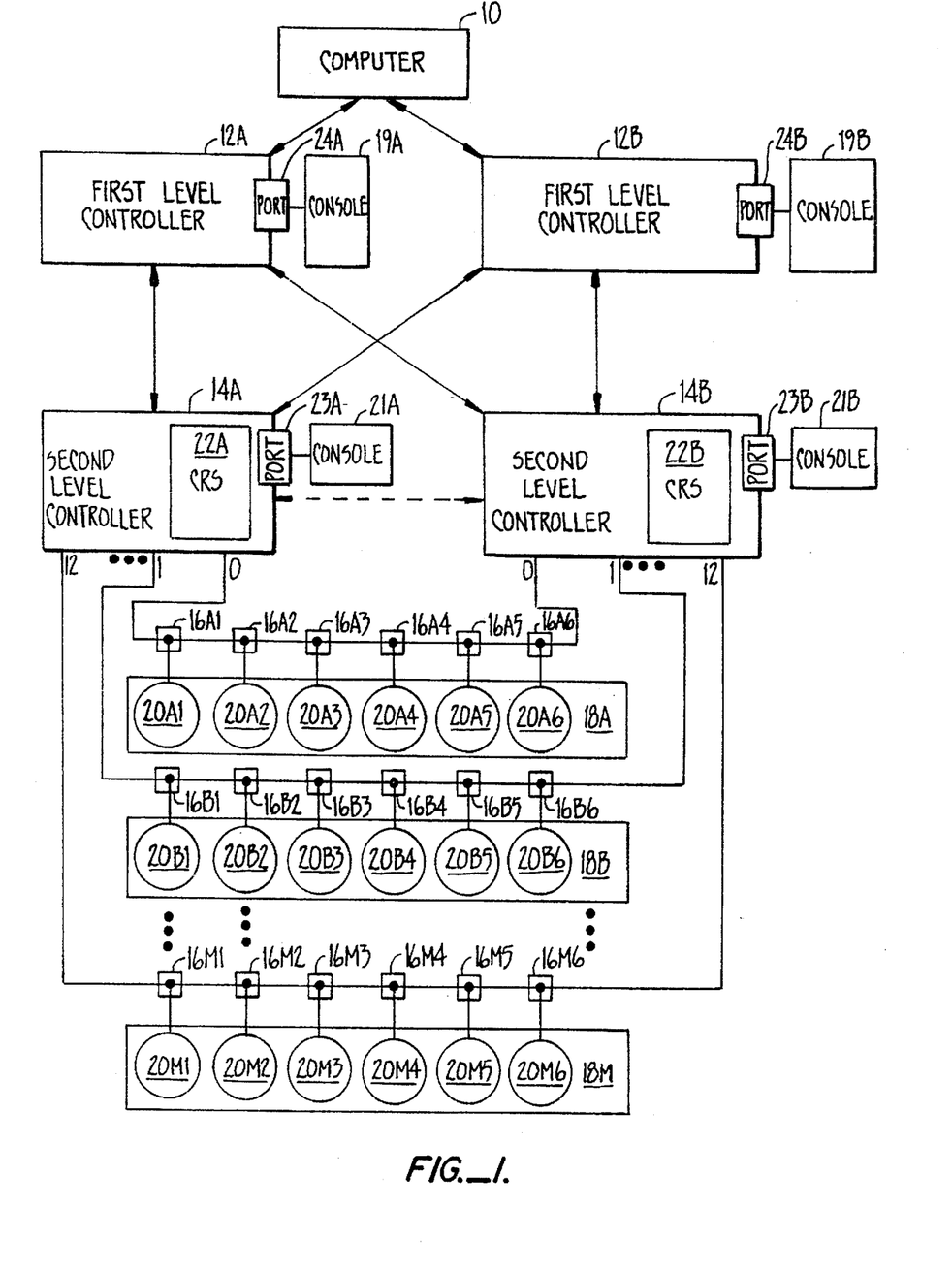
FIG. 1 is a diagram illustrating the overall system in which the present invention is embodied.

FIG. 1 is a diagram showing an overall view of the input/output system associated with a computer 10 for accessing disk drives. Computer 10 has its input/output ports connected to a pair of first level controllers 12A and 12B. In a second controller level a pair of second level controllers 14A and 14B are shown connected to first level controllers 12A and 12B. The lines between second level controllers 14 and first level controller 12 represent data buses through which data flows. The dashed line between second level controller 14A and second level controller 14B represents a communication line through which the devices communicate with each other.

Second level controllers 14 are each connected to a group of disk drive arrays 18A–18M through switches 16A–16M.

Disk drives 20 are arranged in a manner so that each second level controller 14 is primarily responsible for one group of disk drive arrays. As shown in FIG. 1, second level controller 14A may be primarily responsible for three drives in each disk drive array 18A–18M. Similarly, second level controller 14B may be primarily responsible for the remaining three disk drives in disk drive arrays 18A–18M. Second level controllers 14 are secondarily responsible for the disk drives primarily controlled by the partner second level controller. In the particular arrangement shown in FIG. 1, second level controller 14A may be primarily responsible for the left three drives (i.e. 20A1–20A3) in each disk drive array 18 and secondarily responsible for the right three disk drives (i.e. 20A4–20A6) in disk drive arrays 18. Second level controller 14B is primarily responsible for the right three disk drives (i.e. 20A4–20A6) in each disk drive array 18 and secondarily responsible for the left three disk drives (i.e. 20A1–20A3) in disk drive arrays 18.

Each second level controller 14 contains a second level controller recovery system (CRS) 22. CRS 22 is a portion of software code which manages the communication between second level controllers 14 and first level controllers 12. CRS 22 is typically implemented as a state machine which is in the form of microcode or sequencing logic for moving second level controller 14 from state to state (described below). State changes are triggered as different events occur and messages are sent between the various components of the system.

Figure 2:
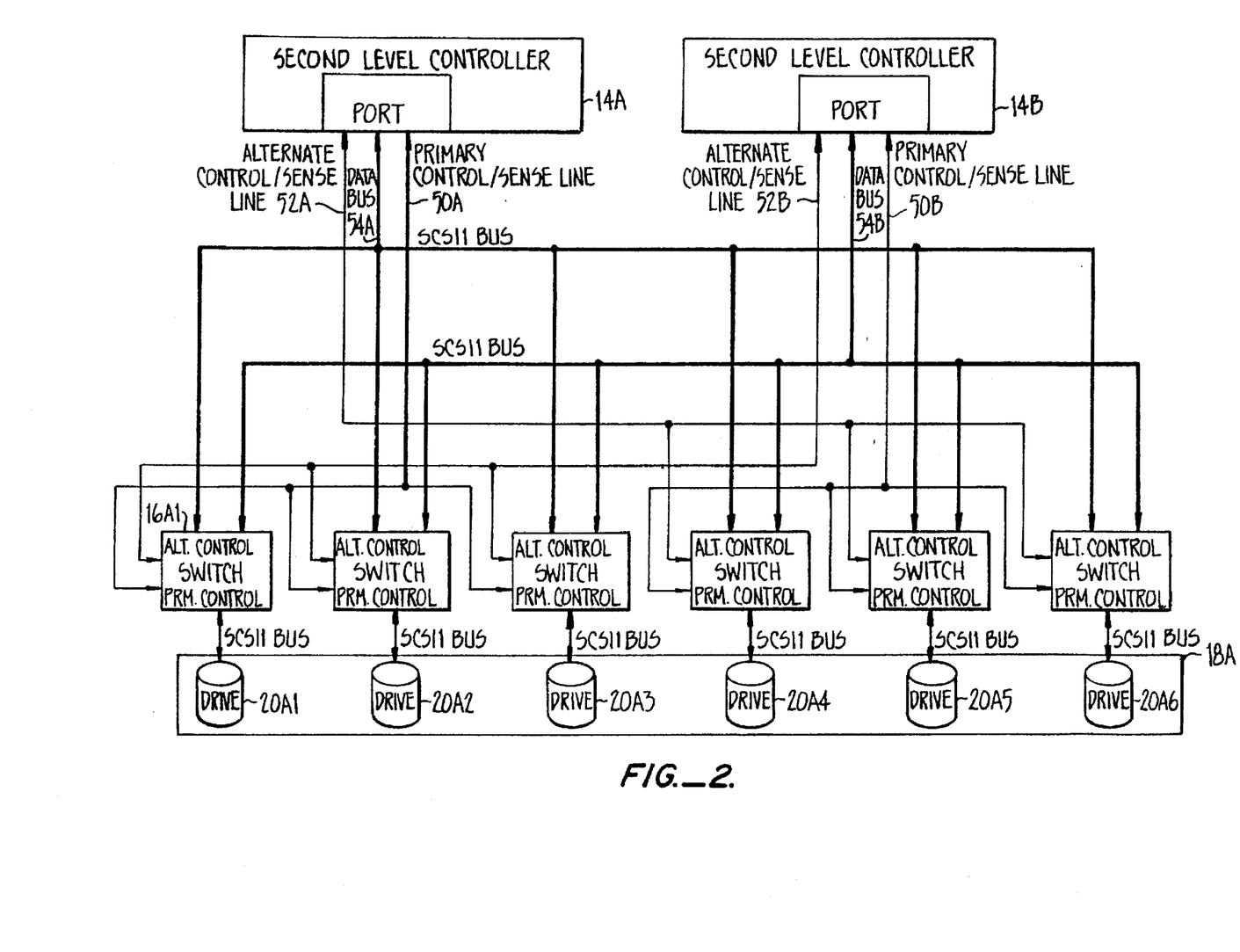
FIG. 2 is a diagram showing a more detailed illustration including the interconnections between the second level controllers and the disk drives.

FIG. 2 is a block diagram showing a more detailed illustration of the interconnections between second level controllers 14A and 14B and the disk drives. For simplicity, only a single disk drive array 18A is shown. More disk drive arrays may be included in the system as shown in FIG. 1.

Second level controller 14A has a primary control/sense line 50A for controlling its primary set of disk drives. An alternate control/sense line 52A controls an alternate set of disk drives. Of course, second level controller 14B has a corresponding set of control/sense lines. Data buses 54A (second level controller 14A) and 54B (second level controller 14B) carry the data to and from disk drives 20. These data buses are typically in the form of a SCSI bus.

A set of switches 16A–16M are used to grant control of the disk drives to a particular second level controller. For example, in FIG. 2, second level controller 14A has primary responsibility for disk drives 20A1–20A3 and alternate control of disk drives 20A4–20A6. Second level controller 14B has primary control of disk drives 20A4–20A6 and alternate control of disk drives 20A1–20A3. By changing the signals on control/sense lines 50 and 52, primary and secondary control can be altered.

Figure 3:
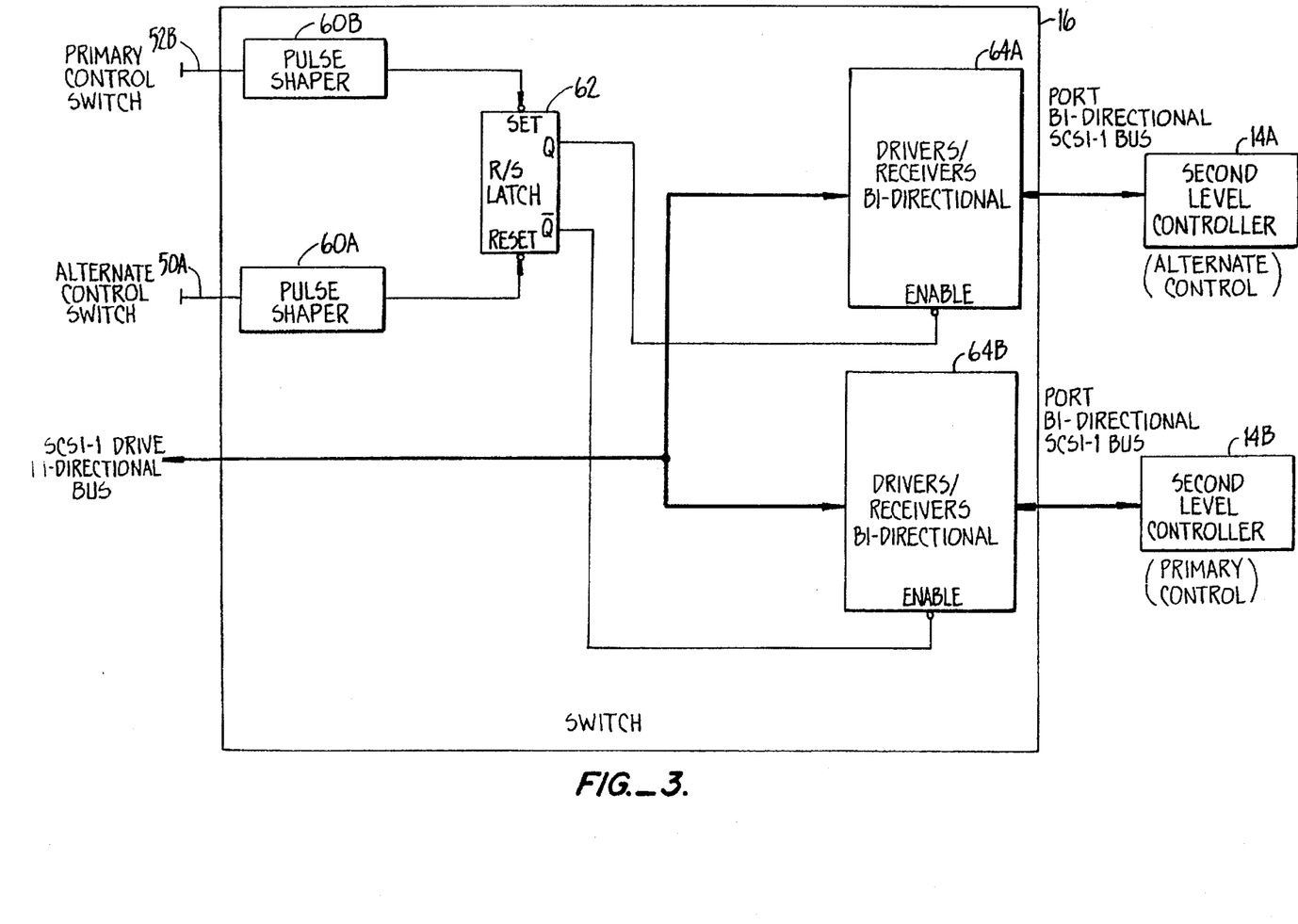
FIG. 3 is a block diagram showing the schematic circuitry of the switching function control circuitry shown in FIG. 2.

FIG. 3 is a more detailed illustration of one of the switches 16A–16M. A pair of pulse shapers 60A and 60B receive the signals from the corresponding control/sense lines 50A and 52B shown in FIG. 2. Pulse shapers 60 clean up the signals which may have lost clarity as they were transmitted over the lines. Pulse shapers of this type are well known in the art. The clarified signals from pulse shapers 60 are then fed to the set and reset pins of R/S latch 62. The Q and $\overline{Q}$ outputs of latch 62 are sent to the enable lines of a pair of driver/receivers 64A and 64B. Driver/receivers 64A and 64B are connected between the disk drives and second level controllers 14A and 14B. Depending upon whether primary control/sense line 52B or alternate control/sense line 50A is active, the appropriate second level controller will be in control at a particular time.

Figure 4:
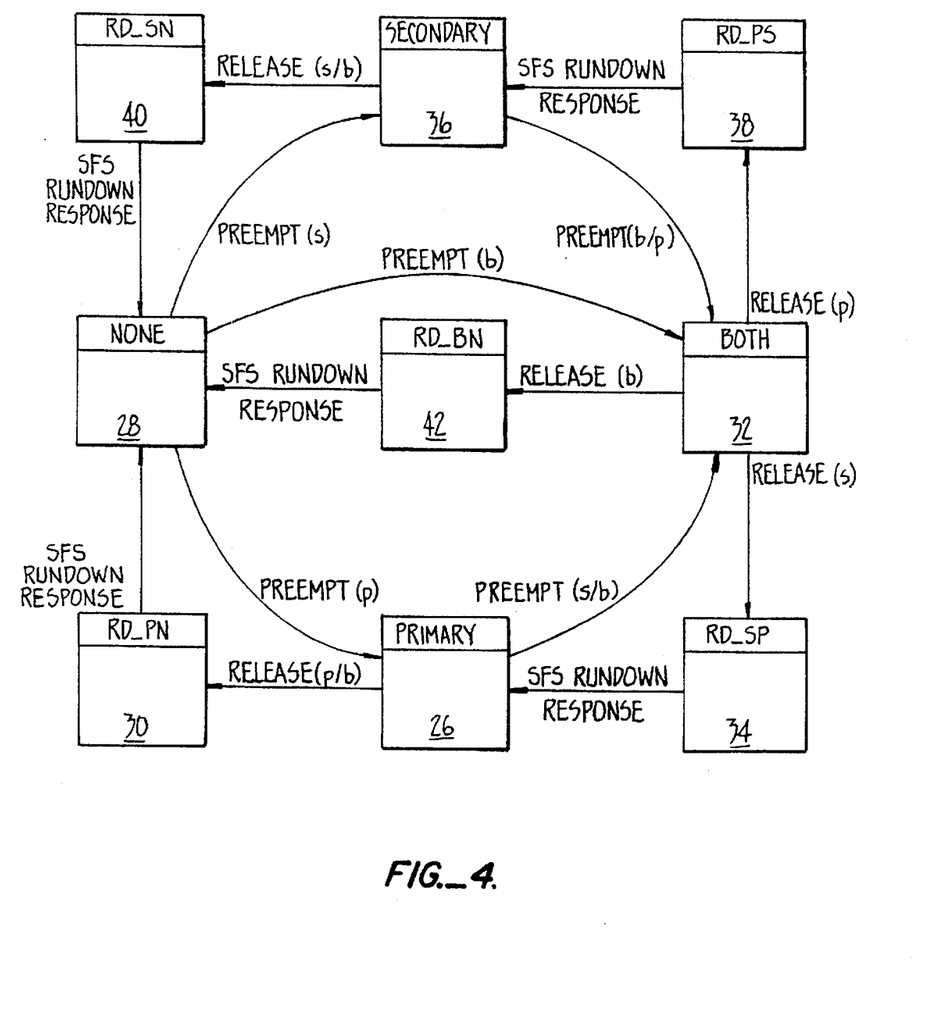
FIG. 4 is a recovery state transition diagram illustrating the various possible states of a particular second level controller.

FIG. 4 is a state transition diagram showing the relationships between the various states of CRS 22 (FIG. 1) of a particular second level controller 14. Each second level controller 14 must be in only one state at any particular point in time. Initially, assuming that the system is functioning properly and each second level controller 14 is primarily responsible for half of the disk drives in each disk drive array 18 and secondarily responsible for half of the disk drives in each disk drive array 18, second level controller 14 is in a PRIMARY STATE 26. While in PRIMARY STATE 26, two major events may happen to move a second level controller 14 from PRIMARY STATE 26 to another state. The first event, is the failure of the particular second level controller 14. If there is a failure, second level controller 14 shifts from PRIMARY STATE 26 to a NONE STATE 28. In the process of doing so, it will pass through RUN-DOWN-PRIMARIES-TO-NONE STATE 30.

There are two types of failures which are possible in second level controller 14. The first type of failure is a controlled failure. Further, there are two types of controlled failures.

The first type of controlled failure is a directed controlled failure. This is not actually a failure but instead an instruction input from an outside source instructing a particular second level controller to shut down. This instruction may be received in second level controller 14 from one of the following sources: An operator, through computer 10; a console 19 through a port 24 (e.g. RS-232) on the first level controller; a diagnostic console 21 through a port 23 (e.g. RS-232) on the second level controller; or by software initiated during predictive maintenance. Typically, such an instruction is issued in the case where diagnostic testing of a second level controller is to be conducted. In a directed controlled failure, the second level controller finishes up any instructions it is currently involved with and refuses to accept any further instructions. The second level controller effects a "graceful" shut down by sending out messages to the partner second level controller that it will be shutting down.

The second type of controlled failure is referred to as a moderate failure. In this case, the second level controller recognizes that it has a problem and can no longer function properly to provide services to the system. For example, the memory or drives associated with that second level controller may have malfunctioned. Therefore, even if the second level controller is properly functioning, it cannot adequately provide services to the system. It aborts any current instructions, refuses to accept any new instructions and sends a message to the partner second level controller that it is shutting down. In both controlled failures, the malfunctioning second level controller releases the set of disk drives over which it has primary control. These drives are then taken over by the partner second level controller.

The second type of failure is a complete failure. In a complete failure, the second level controller becomes inoperable and cannot send messages or "clean-up" its currently pending instructions by aborting them. In other words, the second level controller has lost its ability to serve the system. It is up to one of the first level controllers or the partner second level controller to recognize the problem. The partner second level controller then takes control of the drives primarily controlled by the malfunctioning second level controller. The routing through the malfunctioning second level controller is switched through the partner second level controller.

In all of the above failures, the switching takes place without interruption to the operation of the computer. Second level controllers 14 and first level controllers 12 handle the rerouting independently by communicating the failure among themselves.

Assuming there was a failure in second level controller 14A, second level controller 14A moves from PRIMARY STATE 26 through a transition RUN-DOWN-PRIMARIES-TO-NONE STATE 30 to NONE STATE 28. At the same time, properly functioning second level controller 14B moves from PRIMARY STATE 26 to BOTH STATE 32. The basis for the change in state of each of second level controllers 14A and 14B is the failure of second level controller 14A. When a second level controller fails, it is important to switch disk drive control away from the failed second level controller. This permits computer 10 to continue to access disk drives which were formerly controlled by a particular second level controller which has failed. In the current example (FIG. 2), disk drives 20A1–20A3 are switched by switching functions 16A1–16A3 so that they are primarily controlled by second level controller 14B. Therefore, second level controller 14B is in BOTH STATE 32 indicating that it has control of the disk drives of both second level controllers. Second level controller 14A now controls none of the disk drives and is in NONE STATE 28. The transition state 30 determines which of several possible transition paths is used.

If second level controller 14A is in NONE STATE 28 and second level controller 14B is in BOTH STATE 32 there are a number of options for transferring control of disk drives 20A1–20A6 once second level controller 14A has been repaired. First, second level controller 14A and second level controller 14B could each be shifted back to PRIMARY STATE 26. This is accomplished by second level controller 14A moving from NONE STATE 28 directly to PRIMARY STATE 26 along the preempt p line. Preempt p simply stands for "preempt primary" which means that second level controller 14A preempts its primary drives or takes control of them from second level controller 14B. At the same time, second level controller 14B moves from BOTH STATE 32 through a transition RUN-DOWN-SECONDARIES-TO-PRIMARIES STATE 34 and then to PRIMARY STATE 26.

A second alternative is for second level controller 14A to move from NONE STATE 28 to SECONDARY STATE 36. Once in SECONDARY STATE 36, second level controller 14A is in control of its secondary disk drives 20A4–20A6. Second level controller 14B concurrently moves from BOTH STATE 32 through RUN-DOWN-PRIMARIES-TO-SECONDARIES STATE 38 and on to SECONDARY STATE 36. When both second level controllers are in SECONDARY STATE 36, they are in control of their secondary disk drives. Second level controller 14A controls disk drives 20A4–20A6 and second level controller 14B controls disk drives 20A1–20A3.

From SECONDARY STATE 36, a failing second level controller 14 may move through RUN-DOWN-SECONDARIES-TO-NONE STATE 40 to NONE STATE 28. If this occurs, the properly functioning partner second level controller 14 moves from SECONDARY STATE 36 to BOTH STATE 32 so that computer 10 could access any one of disk drives 20A1–20A6. As in the previous example, if second level controller 14A were to fail it moves from SECONDARY STATE 36 through RUN-DOWN-SECONDARIES-TO-NONE STATE 40 and into NONE STATE 28. At the same time, properly functioning second level controller 14B moves from SECONDARY STATE 36 along the preempt b/p line into BOTH STATE 32. Preempt b/p stands for "preempt both/primaries." In other words, all of the disk drives are preempted by the properly functioning second level controller.

If second level controller 14A is in NONE STATE 28 and second level controller 14B is in BOTH STATE 32, it is possible for second level controller 14A to take control of both sets of disk drives. This is desirable if second level controller 14A were repaired and second level controller 14B failed. Second level controller 14A moves from NONE STATE 28 along the preempt b line to BOTH STATE 32. At the same time, second level controller 14B moves from BOTH STATE 32 through RUN-DOWN-BOTH-TO-NONE STATE 42 and into NONE STATE 28. At this point, second level controller 14A controls all disk drives 20A1–20A6 while second level controller 14B controls none of the disk drives.

Figure 5A:
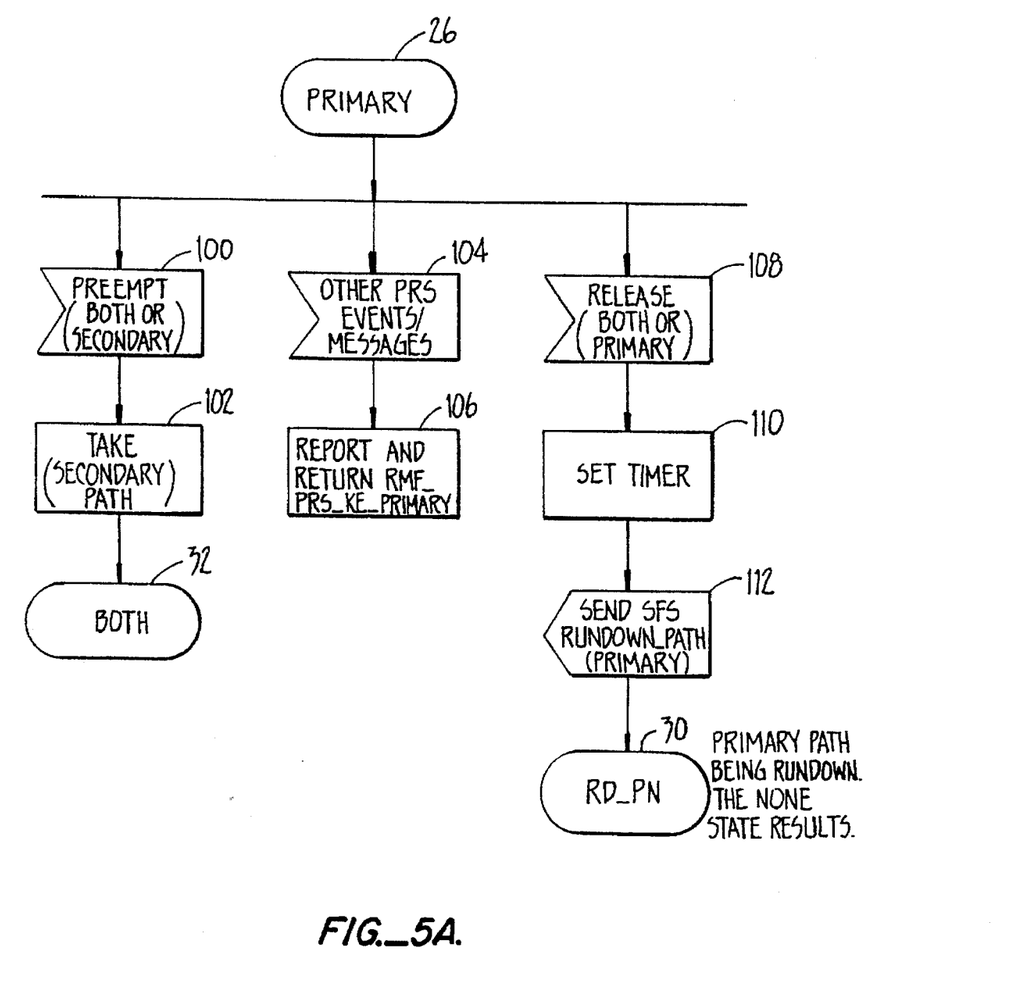
FIGS. 5A–5I show the events which take place during the transition between each of the states shown in FIG. 2.

Various failures may trigger the movement of second level controllers 14 between states. Between states a number of events take place. Each of these events is described in FIGS. 5A–5I. In FIG. 5A, second level controller 14 is in PRIMARY STATE 26. There are three different events which can take place while second level controller 14 is in PRIMARY STATE 26. The first event is for a preempt message 100 to be received from the partner second level controller. At this point, the second level controller receiving such a message will take the secondary path, represented by block 102, and end up at BOTH STATE 32. The second path which may be taken is triggered by receipt of a message 104 from CRS 22 of the other second level controller. This may be some sort of communication which results in the second level controller remaining in PRIMARY STATE 26. It will report and return messages 106 to the other second level controller. The final path which may be taken results in second level controller ending up in RUN-DOWN-PRIMARIES-TO-NONE STATE 30. This path is triggered upon receipt of a message 108 to release both sets of drives or the primary disk drives. A timer is then set in block 110 and upon time out a message 112 is sent to the other second level controller to take control of the primary set of disk drives. Once in RUN-DOWN-PRIMARIES-TO-NONE STATE 30, second level controller 14 will eventually end up in NONE STATE 28.

Figure 5B:
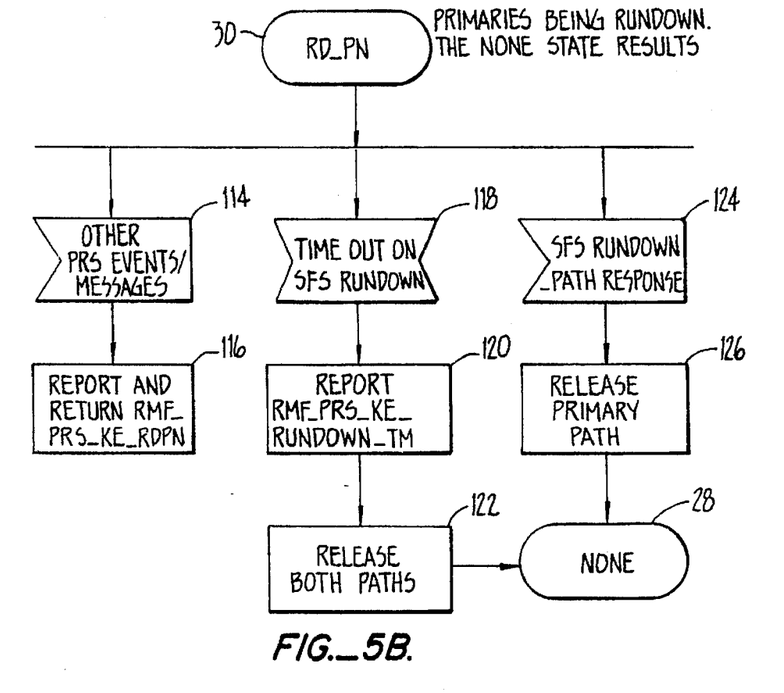

FIG. 5B illustrates various paths from RUN-DOWN-PRIMARIES-TO-NONE STATE 30 to NONE STATE 28. Three possible events may take place. First, a message 114 may be received from another second level controller providing communication information. In this case, second level controller 14 reports back messages 116 and remains in RUN-DOWN-PRIMARIES-TO-NONE STATE 30. The second event which may occur is for the timer, set during transition from PRIMARY STATE 26 to RUN-DOWN-PRIMARIES-TO-NONE STATE 30 to time out 118. If this happens, second level controller 14 realizes that message 112 (FIG. 5A) didn't get properly sent and that there has been a complete failure. It releases control of both its primaries and secondary disk drives 122. It then ends up in NONE STATE 28. The third event which may occur while in RUN-DOWN-PRIMARIES-TO-NONE STATE 30 is for a response to be received 124 from message 112 (FIG. 5A) sent out while second level controller moved from PRIMARY STATE 26 to RUN-DOWN-PRIMARIES-TO-NONE STATE 30. This response indicates that the message was properly received. Second level controller 14 then releases its primary drives 126 and ends up in NONE STATE 28.

Figure 5C:
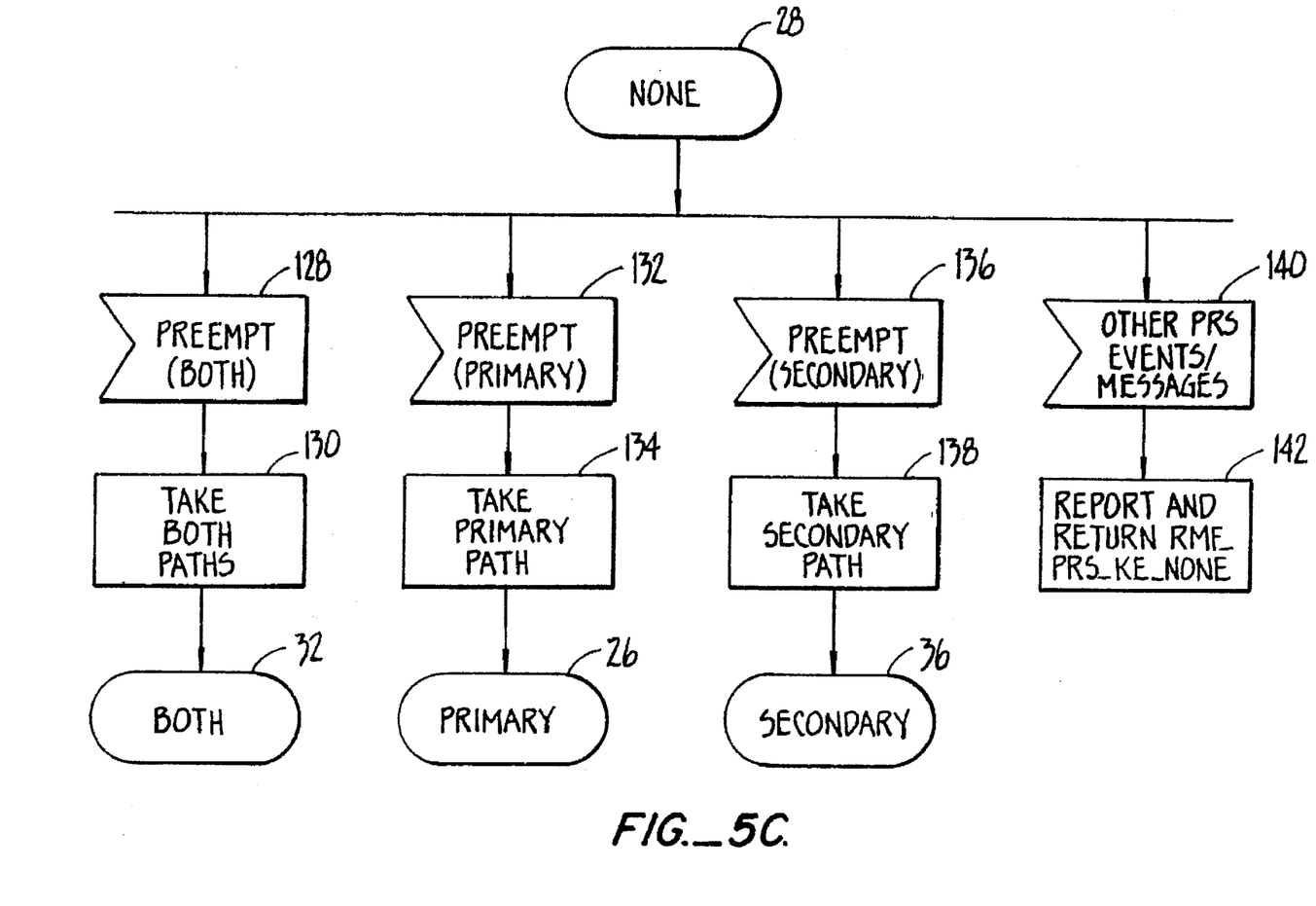

FIG. 5C covers the state transition between NONE STATE 28 and one of either BOTH STATE 32, PRIMARY STATE 26, or SECONDARY STATE 36. When in NONE STATE 28, second level controller 14 can only receive messages. First, it may receive a message 128 instructing it to preempt both its primary and alternative sets of disk drives. It performs this function 130 and ends up in BOTH STATE 32. A second possibility is for it to receive a preempt message 132 instructing it to preempt its primary set of drives. It performs this instruction and ends up in PRIMARY STATE 26. A third alternative is the receipt of a preempt message 136 instructing second level controller 14 to preempt its secondary drives. Upon performance of this instruction 138 it ends up in SECONDARY STATE 36. Finally, while in NONE STATE 28 second level controller 14 may receive communication messages 140 from its partner second level controller. It reports back 142 to the other second level controller and remains in NONE STATE 28.

Figure 5D:
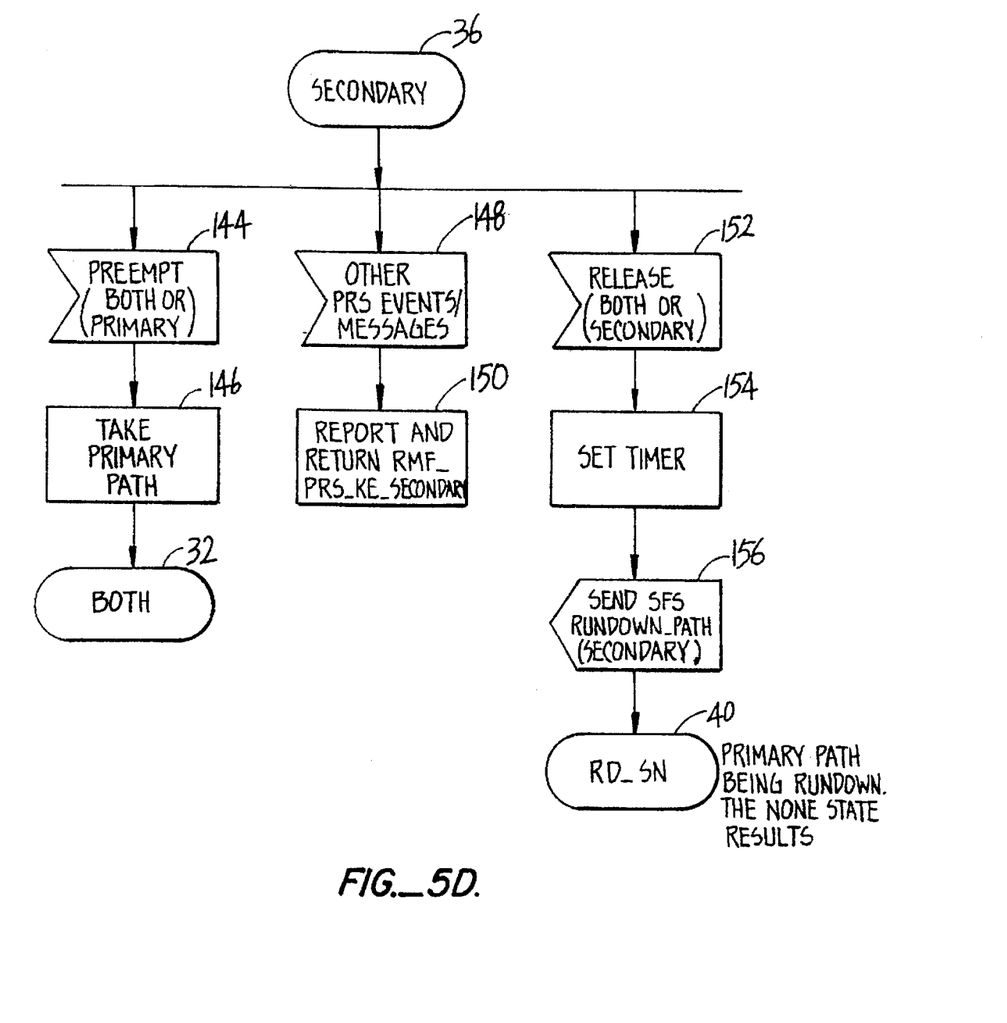

FIG. 5D illustrates the movement of second level controller 14 from SECONDARY STATE 36 to BOTH STATE 32 or RUN-DOWN-SECONDARIES-TO-NONE STATE 40. While in SECONDARY STATE 36, any one of three messages may be received by second level controller 14. A first possibility is for a preempt both or primary message 144 to be received. At this point, second level controller 14 takes control of its primary drives 146 and ends up in BOTH STATE 32. A second possibility is for communication messages 148 to be received from the partner controller. This results in second level controller 14 reporting back 150 and remaining in its present SECONDARY STATE 36. Finally, a release both or secondary message 152 may be received. Second level controller 14 sets a timer 154 upon receipt of this message. It then sends out a message 156 indicating it is now in RUN-DOWN-SECONDARIES-TO-NONE STATE 40.

Figure 5E:
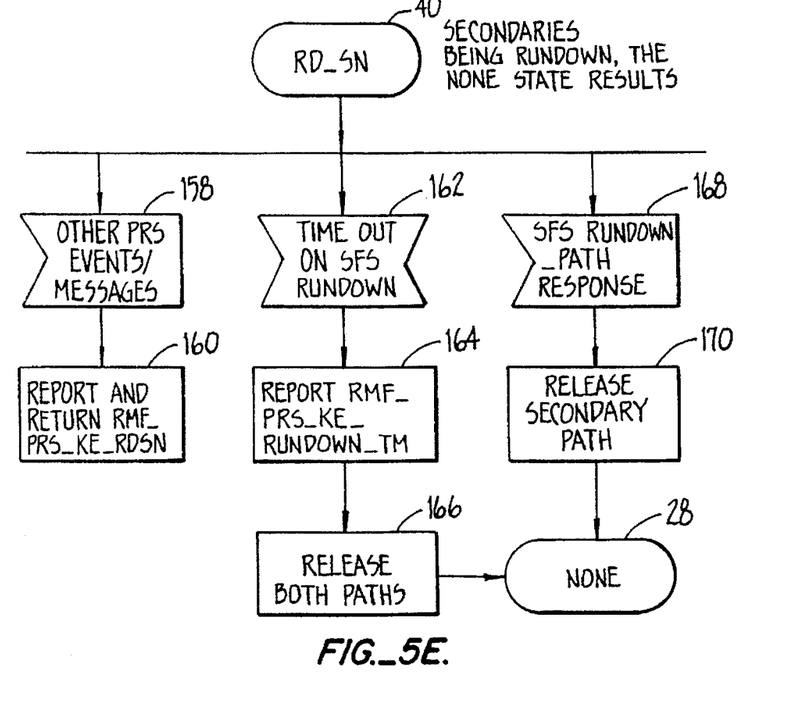

FIG. 5E shows the transition of second level controller 14 from RUN-DOWN-SECONDARIES-TO-NONE STATE 40 to NONE STATE 28. Three different messages may be received during RUN-DOWN-SECONDARIES-TO-NONE STATE 40. First, messages 158 from the partner second level controller may be received. Second level controller 14 then reports back (160) to its partner and remains in RUN-DOWN-SECONDARIES-TO-NONE STATE 40. A second possibility is for the timer, set between SECONDARY STATE 36 and the present state, to time out (162). This indicates that message 156 (FIG. 5D) was not properly sent out and received by the partner second level controller and that there has been a complete failure to second level controller 14. Second level controller 14 then reports out (164) that it will release both of its sets of disk drives 166. This results in it moving to NONE STATE 28. Finally, second level controller 14 may receive a response 168 to its message 156 (FIG. 5D) sent after setting the timer between SECONDARY STATE 36 and RUN-DOWN-SECONDARIES-TO-NONE STATE 40. Upon receiving this response, it releases its secondary drives and ends up in NONE STATE 28.

Figure 5F:
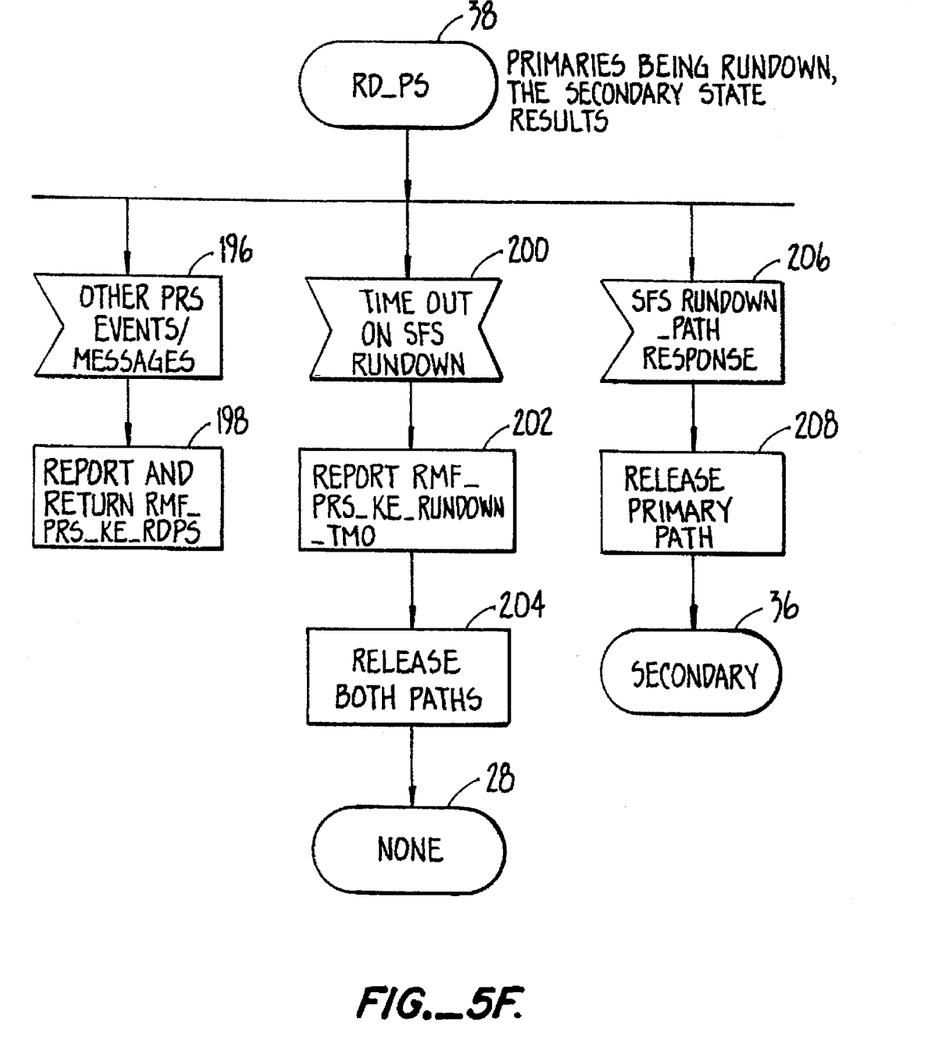

FIG. 5F illustrates the various paths from BOTH STATE 32 to any one of RUN-DOWN-PRIMARIES-TO-SECONDARIES STATE 38, RUN-DOWN-SECONDARIES-TO-PRIMARIES STATE 34 or RUN-DOWN-BOTH-TO-NONE STATE 42. A first possible message which may be received during BOTH STATE 32 is a release primary message 172. This will cause second level controller 14 to set a timer 174, send a message 176 indicating it is running down primaries, and wait in RUN-DOWN-PRIMARIES-TO-SECONDARIES STATE 38. A second message which may be received is a release secondaries message 180. Upon receiving release secondaries message 180, second level controller 14 sets a timer 182 and sends a message 184 indicating it has moved into RUN-DOWN-SECONDARIES-TO-PRIMARIES STATE 34. A third possibility for second level controller 14 is to receive communication messages 186 from its partner second level controller. It will report back (188) and remain in BOTH STATE 32. Finally, second level controller 14 may receive an instruction 190 telling it to release both sets of drives. At this point it sets the timer 192 and sends out a message 194 that it has released both sets of drives. It will then remain in the RUN-DOWN-BOTH-TO-NONE STATE 42 until it receives further instructions from the other second level controller.

Figure 5G:
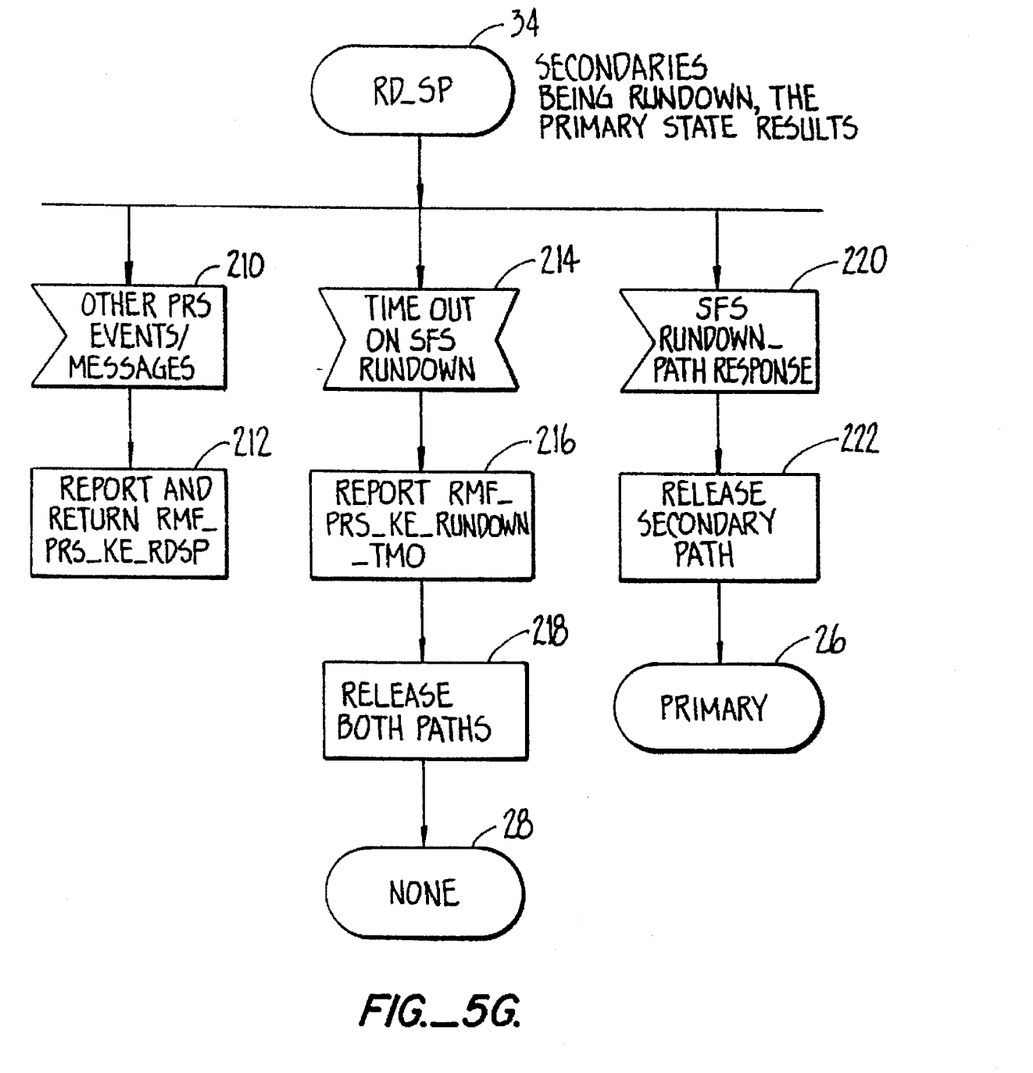

FIG. 5G shows the various paths by which second level controller 14 moves from RUN-DOWN-PRIMARIES-TO-SECONDARIES STATE 38 to one of either NONE STATE 28 or SECONDARY STATE 36. The first possibility is that second level controller 14 receives messages 196 from the other second level controller. It then reports back (198) and remains in RUN-DOWN-PRIMARIES-TO-SECONDARIES STATE 38. A second possibility is that the timer, set between BOTH STATE 32 and RUN-DOWN-PRIMARIES-TO-SECONDARIES STATE 38 times out (200). At this point, second level controller 14 realizes that message 176 (FIG. 5F) was not properly sent. A complete failure has occurred. The second level controller reports (202) that it has released both sets of disk drives, and releases both sets (204). Second level controller 14 then enters NONE STATE 28. Finally, a run down path response message 206 is received acknowledging receipt of message 176 (FIG. 5F) sent between BOTH STATE 32 and RUN-DOWN-PRIMARIES-TO-SECONDARIES STATE 38. Second level controller 14 releases its primary drives 208 and enter SECONDARY STATE 36.

Figure 5H:
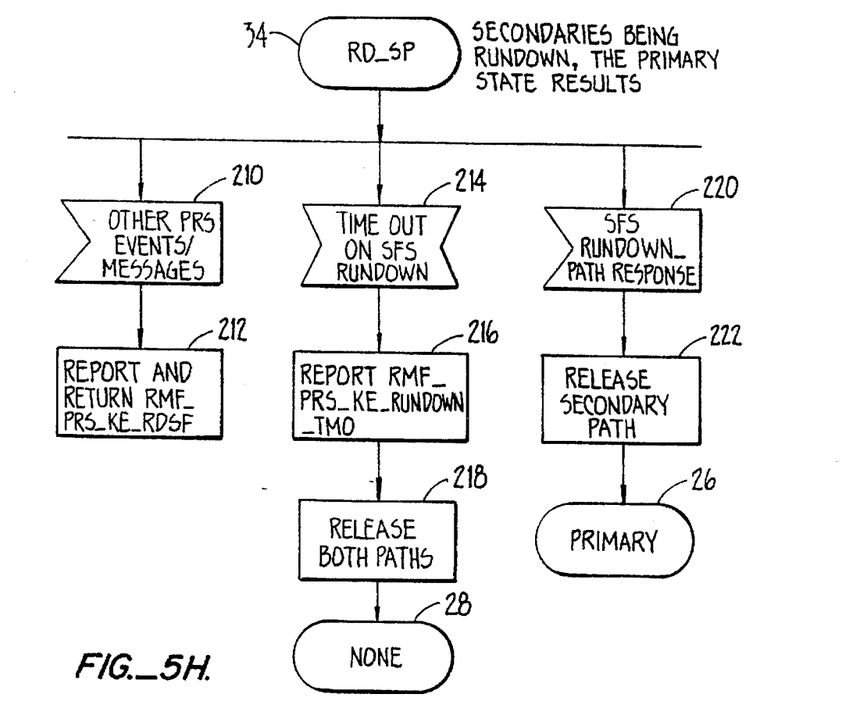

FIG. 5H shows the possible paths down which second level controller 14 moves between RUN-DOWN-SECONDARIES-TO-PRIMARIES STATE 34 and one of either NONE STATE 28 or PRIMARY STATE 26. A first possibility is that second level controller 14 receives a message 210 from the other second level controller. It then reports back (212) and remains in RUN-DOWN-SECONDARIES-TO-PRIMARIES STATE 34. A second possibility is that the timer, set between BOTH STATE 32 and RUN-DOWN-SECONDARIES-TO-PRIMARY-STATE 34 times out (214). If this occurs, second level controller 14 realizes that message 184 (FIG. 5F) was not properly sent. A complete failure has occurred. Second level controller then sends a message 216 indicating that it has released its drives and then it releases both sets of disk drives (218) which it controls. Second level controller then moves into NONE STATE 28. Finally, a third possibility is that second level controller 14 receives a response 220 to message 184 (FIG. 5F) sent between BOTH STATE 32 and RUN-DOWN-SECONDARIES-TO-PRIMARIES-STATE 34. It will then release (222) its secondary drives and enter PRIMARY STATE 26.

Figure 5I:
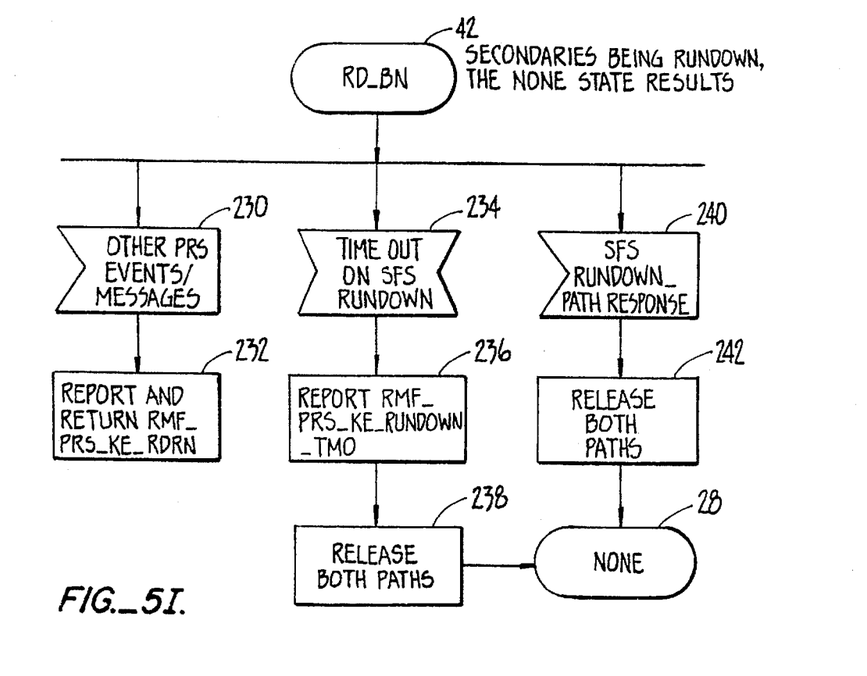

FIG. 5I shows the possible paths illustrating the transition of second level controller between RUN-DOWN-BOTH-TO-NONE STATE 42 and NONE STATE 28. Three possible events may take place. First, a message 230 may be received from another second level controller providing communication information. In this case, second level controller 14 reports back messages 232 and remains in RUN-DOWN-BOTH-TO-NONE STATE 42. The second event which may occur is for the timer, set during transition from BOTH STATE 32 to RUN-DOWN-BOTH-TO-NONE STATE 42, to time out (234). If this happens, second level controller 14 realizes that message 194 (FIG. 5F) sent during BOTH STATE 32 didn't get properly sent and that there has been a complete failure. It releases control of both its primaries and secondary disk drives (238). It then ends up in NONE STATE 28. The third event which may occur while in RUN-DOWN-BOTH-TO-NONE STATE 42 is for a response to be received (240) from message 194 (FIG. 5F) sent out while second level controller moved from BOTH STATE 32 to RUN-DOWN-BOTH-TO-NONE STATE 42. This response indicates that the message was properly received. Second level controller 14 then releases both sets of drives (242) and ends up in NONE STATE 28.

In general, to those skilled in the art to which this invention relates, many changes in construction and widely differing embodiments and applications of the present invention will suggest themselves without departing from its spirit and scope. For instance, a greater number of second level controllers and first level controllers may be implemented in the system. Further, the structure of the switching circuitry connecting the second level controllers to the disk drives may be altered so that different drives are the primary responsibility of different second level controllers. Thus, the disclosures and descriptions herein are purely illustrative and not intended to be in any sense limiting. The scope of the invention is set forth in the appended claims.

What is claimed is:

1. In a data storage subsystem for controlling data flow between a computer and a plurality of memory devices including a plurality of level-one controllers, independent of and coupled to said computer and a plurality of level-two controllers coupled between said level-one controllers and said memory devices, a method comprising the steps of:
   determining, within one of said level-one or level-two controllers that the first level-two controller has stopped functioning properly; and
   switching from a first level-one controller-level-two controller (LOC-LTC) path between a first level-one controller and the first level-two controller to a second LOC-LTC path between the first level-one controller and the second level-two controller.

2. The method of claim 1 further comprising the step of switching from a third LOC-LTC path between a second level-one controller and the first level-two controller to a fourth LOC-LTC path between the second level-one controller and the second level-two controller.

3. The method of claim 2 further comprising the step of switching a connection to a plurality of memory devices from the first level-two controller to said second level-two controller.

4. A data storage subsystem for linking a computer to a plurality of memory devices comprising:

a plurality of first-level controllers, independent of said computer and coupled to said computer, configured to handle input/output storage communications with the computer;

a communication bus coupled to said first-level controllers; and first and second second-level controllers, each connected to said communication bus, said first second-level controller being connected to a first group of said memory devices, for routing data from at least one of said first-level controllers to said first group of memory devices, said second second-level controller being coupled to a second group of memory devices and said first group of memory devices, and including means, independent of said computer, for detecting a failure of said first second-level controller and re-routing data from at least one of said first-level controllers to said first group of memory devices coupled to said first second-level controller.

5. The data storage subsystem of claim 4 further comprising first communication lines connected between each of said plurality of second-level controllers, and means, in each of said second-level controllers coupled to said first communication lines, for informing another second-level controller that a failure has occurred.

6. The data storage subsystem of claim 4 further comprising switching means, connected between said plurality of second-level controllers and said groups of memory devices, for reconnecting one of said groups of memory devices from a first second-level controller upon failure to a different second-level controller.

7. The data storage subsystem of claim 4 further comprising, in each said second-level controllers, means for detecting a complete failure of another one of said second-level controllers, said complete failure being indicated by the inability of said another second-level controller to communicate its failure.

8. The data storage subsystem of claim 4 further comprising means, in each of said second-level controllers, for communicating a controlled failure of said second-level controller to others of said second-level controller, said controlled failure being indicated by said second-level controller being able to communicate that it is failing.

9. The data storage subsystem of claim 4 wherein each of said second-level controllers includes a controller recovery state machine for responding to the failure of one of said second-level controllers, said state machine including the following states:

a primary state wherein said second-level controller is connected to a group of said memory devices;

a none state wherein said second-level controller is not connected to any of said memory devices; and a both state wherein said second-level controller is connected to two groups of said memory devices.

10. The data storage subsystem of claim 9 further comprising:

a run-down state between said primary and said none states for performing transition functions between said primary and none states;

said primary state being responsive to a diagnostic testing signal provided to said second-level controller from an external source to transition to said run-down state; and means, responsive to said run-down state, for transmitting a controlled failure signal to another of said second-level controllers.

* * * * *